(12) United States Patent
Strzelczyk et al.

(10) Patent No.: US 6,257,374 B1
(45) Date of Patent: Jul. 10, 2001

(54) BRAKE PAD WEAR SENSING SYSTEM AND METHOD

(75) Inventors: Anthony Strzelczyk; Alexander K. Williams, both of Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/641,837

(22) Filed: Aug. 18, 2000

(51) Int. Cl.⁷ ..................................................... B06T 17/22
(52) U.S. Cl. .................................. 188/1.11 L; 188/1.11 E
(58) Field of Search .......................... 188/1.11 L, 1.11 E, 188/171; 340/454

(56) References Cited

U.S. PATENT DOCUMENTS

| | | | |
|---|---|---|---|
| 4,020,454 | * 4/1977 | Malonee | 188/1.11 L |
| 4,076,330 | 2/1978 | Leiber . | |
| 4,147,236 | 4/1979 | Steffen et al. . | |
| 4,184,145 | * 1/1980 | Fima | 188/1.11 L |
| 4,204,190 | 5/1980 | Wiley et al. . | |
| 4,205,190 | * 5/1980 | Wiley et al. | 188/1.11 L |
| 4,298,857 | * 11/1981 | Robins et al. | 188/1.11 L |
| 4,456,098 | 6/1984 | Lindre . | |
| 4,606,435 | * 8/1986 | Johnson | 188/1.11 L |
| 4,685,540 | * 8/1987 | Rath et al. | 188/1.11 L |
| 4,742,326 | * 5/1988 | Gregoire | 188/1.11 L |
| 4,757,300 | 7/1988 | Sebalos . | |
| 4,824,260 | * 4/1989 | Novotny et al. | 188/1.11 L |
| 5,206,625 | 4/1993 | Davis . | |
| 5,327,782 | 7/1994 | Sato et al. . | |
| 5,608,376 | 3/1997 | Ito et al. . | |
| 5,692,585 | 12/1997 | Kazuro et al. . | |
| 5,751,127 | * 5/1998 | Austin et al. | 188/171 |
| 5,767,768 | 6/1998 | DiSaverio . | |
| 5,833,033 | 11/1998 | Takanashi . | |

* cited by examiner

Primary Examiner—Christopher P. Schwartz
(74) Attorney, Agent, or Firm—Tarolli, Sundheim, Covell, Tummino & Szabo L.L.P.

(57) ABSTRACT

A vehicle brake system (12) has a rotor (24) rotatable about an axis (20) and a pad (e.g., 36A) moveable parallel to the axis to engage the rotor for creating braking force. A brake pad wear sensing system (14) for the vehicle brake system (12) includes a magnet (e.g., 50A) that provides a magnetic field. A Hall effect sensor (e.g., 52A) senses the magnetic field and outputs an electrical signal indicative of the sensed magnetic field. Means (e.g., 34A) mounts one of the magnet (e.g., 50A) and the sensor (e.g., 52A) with the pad (e.g., 36A) for movement parallel to the axis (20). Means (e.g., 30A) mounts the other of the magnet (e.g., 50A) and the sensor (e.g., 52A) at a location along the axis (20) such that the signal from the sensor is indicative of pad wear.

8 Claims, 3 Drawing Sheets

BRAKE PAD WEAR SENSING SYSTEM AND METHOD

TECHNICAL FIELD

The present invention is directed to systems and methods for monitoring brake pad wear within vehicle brake systems.

BACKGROUND OF THE INVENTION

Brake systems are employed in various types of vehicles such as automobiles and aircraft, to slow and subsequently stop vehicles. A brake system that is used in a vehicle typically employs high friction brake pads that are connected to a vehicle suspension or frame component so as to prevent rotation of the pads. When a braking force is desired, each pad is moved into engagement with a smooth rotor that is typically in the form of a disk. Specifically, a caliper assembly of the brake system squeezes the rotor between a pair of pads.

The pads are typically made of a composite material and the rotor is typically made of metal. The friction between the non-rotating pads and the rotor provides the braking force. The friction surface of each pad is gradually worn away until the pad is consumed and must be replaced.

Naturally, replacement of pads within a vehicle braking system is a periodic necessity. However, a determination as to when pads are in need of replacement is an inexact science. Failure to replace pads in a timely manner may result in damage to the rotor or other components within the brake system. Typically, repair expense to correct damage to the rotor or other brake system structure is greater than the cost of timely pad replacement.

SUMMARY OF THE INVENTION

In accordance with one aspect, the present invention provides a brake pad wear sensing system for a vehicle brake system having a rotor rotatable about an axis and a pad moveable parallel to the axis to engage the rotor for creating braking force. A magnet provides a magnetic field. A Hall effect sensor senses the magnetic field and outputs an electrical signal indicative of the sensed magnetic field. Means mounts one of the magnet and the sensor with the pad for movement parallel to the axis. Means mounts the other of the magnet and the sensor at a location along the axis such that the signal from the sensor is indicative of pad wear.

A method of sensing brake pad wear for a vehicle brake system having a rotor rotatable about an axis and a pad movable parallel to the axis to engage the rotor for creating braking force. Mounting one of a magnet and a Hall effect sensor with the pad for movement parallel to the axis. Mounting the other of said magnet and said sensor at a location along the axis such that the signal from said sensor is indicative of pad wear, wherein the magnet provides a magnetic field, and wherein the Hall effect sensor senses the magnetic field and outputs an electrical signal indicative of the sensed magnetic field. Sensing the magnetic field during operation of the brake system and providing the signal indicative of pad wear.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXEMPLARY EMBODIMENT

Figure 1:
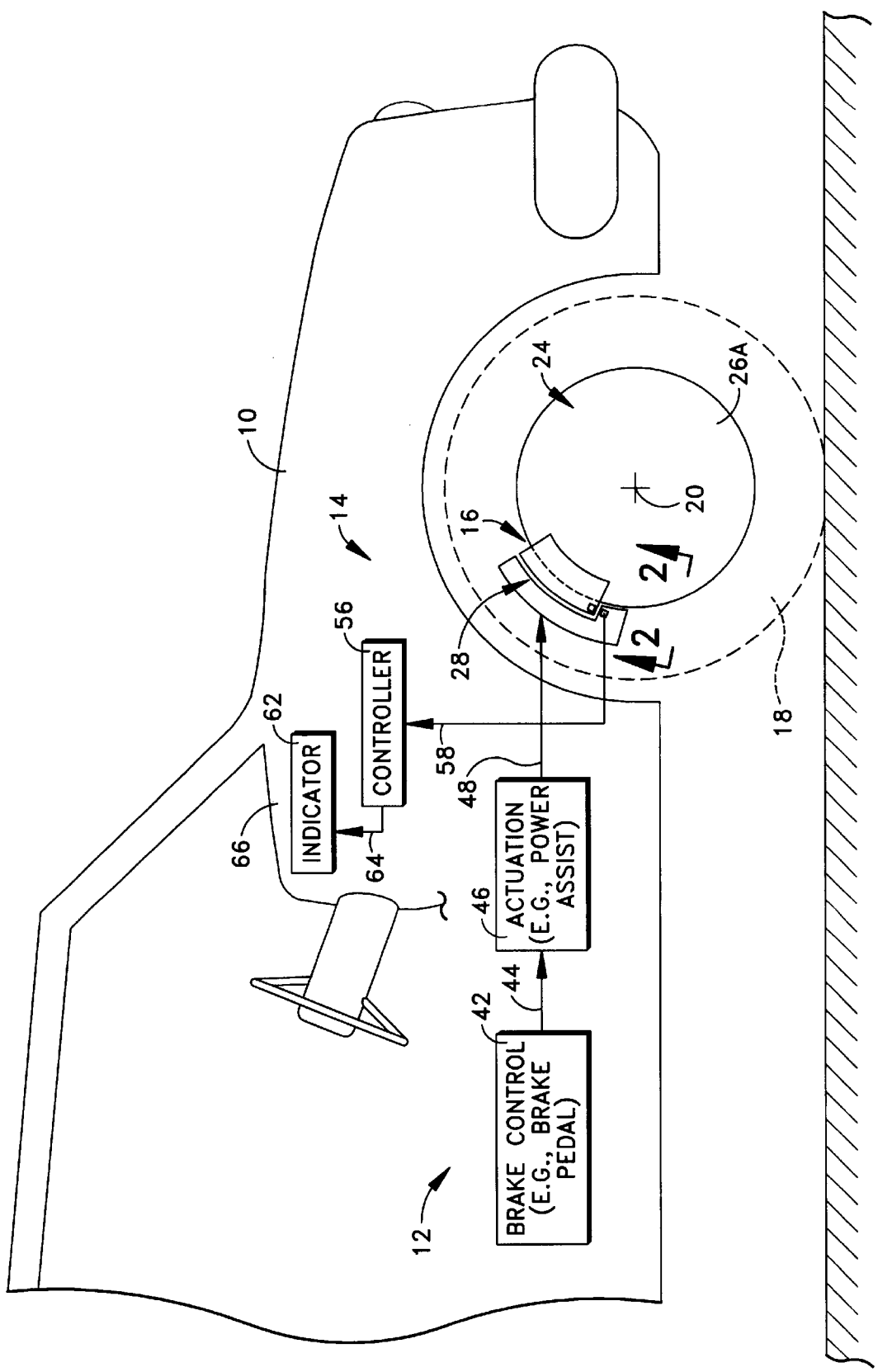
FIG. 1 is a schematic illustration of a vehicle that has a brake system and a brake pad wear sensing system in accordance with the present invention.

A vehicle 10 that includes a brake system 12 and a brake pad wear sensing system 14 in accordance with the present invention is schematically shown in FIG. 1. The brake system 12 includes a plurality of brake units 16 (only one shown). In one example, each brake unit 16 is associated with one of a plurality of wheels 18 (only one shown in phantom) of the vehicle 10. It is to be appreciated that the discussion herein is limited only to a single brake unity 16 and the associated single wheel 18 for simplicity, but that the discussion may be equally applicable to each other brake unit and associated wheel (not shown).

Turning to the brake unit 16 and associated wheel 18 shown in FIG. 1, the wheel is of course rotatable about an axis 20. The brake unit 16 includes a rotor 24 that is fixed for rotation with the vehicle wheel 18 about the axis 20. The rotor 24 is preferably a metal disk. The disk-shaped rotor 24 is circular and has two planar side surfaces 26A and 26B (only side 26A is visible in FIG. 1).

Figure 2:
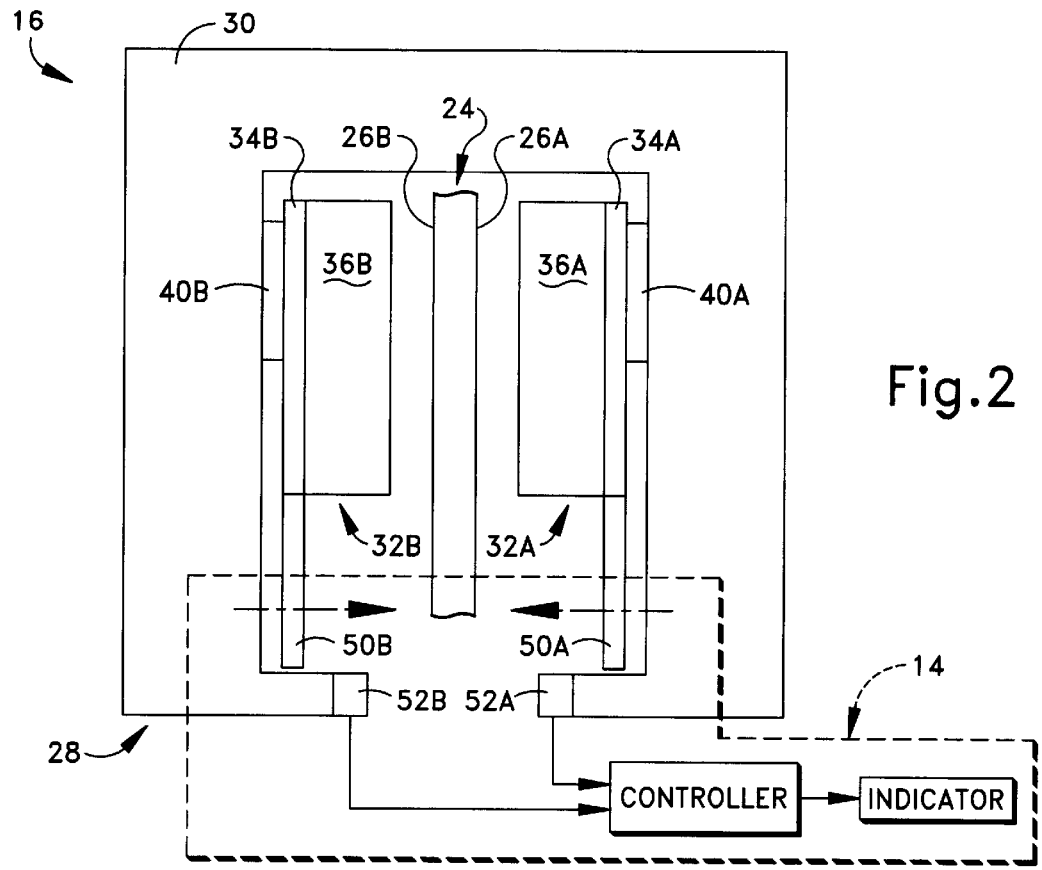
FIG. 2 is a schematic illustration of a portion of the brake system and a portion of the brake pad wear sensing system of FIG. 1, with brake pads being in a first condition and a first position.

A caliper arrangement 28 (shown very schematized and partially broken away in FIG. 1) of the brake unit 16 is affixed to one or more suspension components (not shown) of the vehicle 10 so as to hold the caliper arrangement stationary relative to the rotation of the rotor 24. As shown in FIG. 2, the caliper arrangement 28 has somewhat of a saddle configuration, with portions extending along each side surface 26A and 26B of the rotor 24 (only a fragment shown). A caliper head 30 of the caliper arrangement 28 is located adjacent to a portion of the rotor 24 and is the portion of the caliper arrangement that is fixed to the suspension component to prevent rotation of the caliper arrangement. The caliper head 30 has portions located to face each side surface 26A and 26B of the disk 24.

Figure 3:
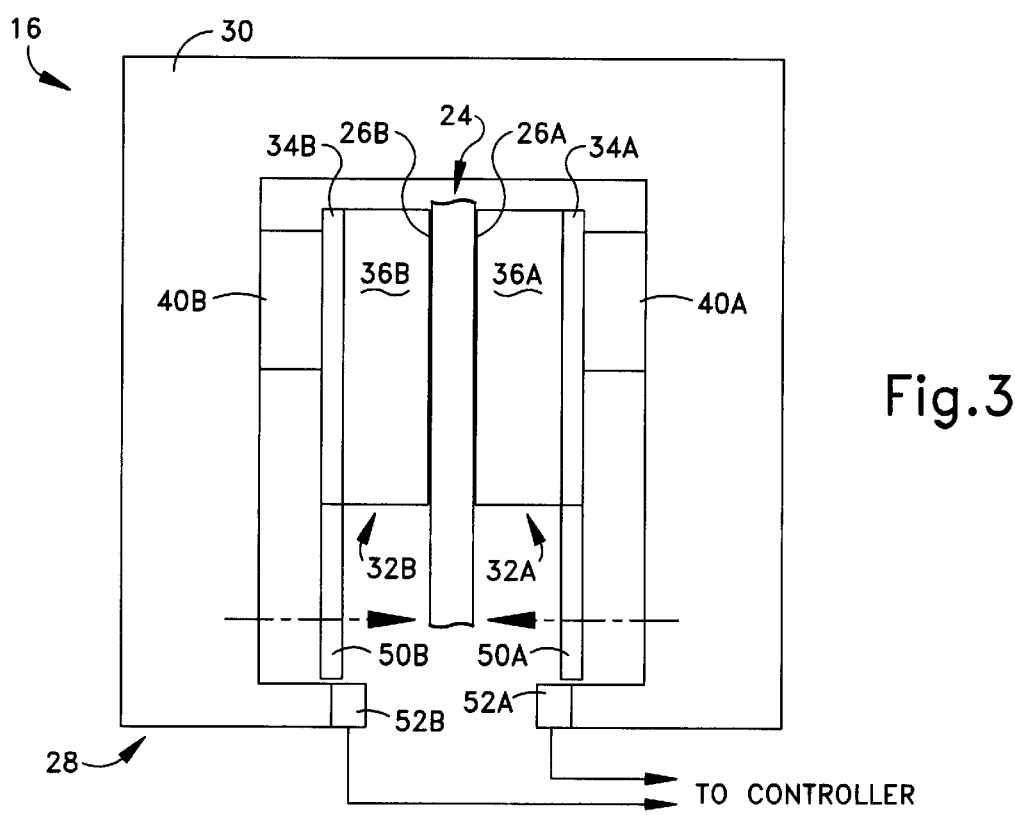
FIG. 3 is an illustration similar to FIG. 2, but with the brake pads in a second position.

The caliper arrangement 28 includes two shoe/pad assemblies 32A and 32B. Each shoe/pad assembly (e.g., 32A) is located adjacent to a respective side (e.g., 26A) of the disk 24 and a respective portion of the caliper head 30. Each shoe/pad assembly (e.g., 32A) is movable as shown in FIGS. 2 and 3. It is to be appreciated that the amount of shown movement is exaggerated for illustrative purposes. The movement of each shoe/pad assembly (e.g., 32A) is preferably linear and parallel to the rotation axis 20 of the rotor 24 (as shown by the arrowheads).

Figure 4:
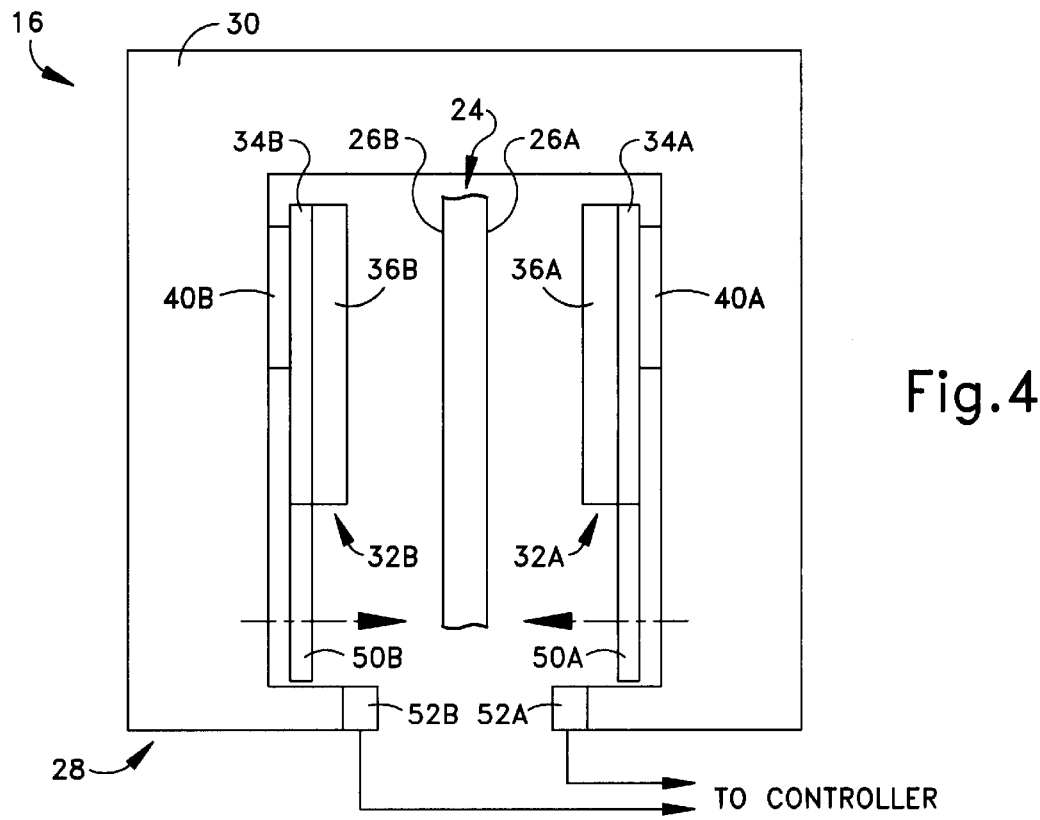
FIG. 4 is an illustration similar to FIG. 2, but with the brake pads in a second condition.

Each shoe/pad assembly (e.g., 32A) includes a metal shoe (e.g., 34A). Mounted onto each shoe (e.g., 34A) is a pad (e.g., 36A) that faces a respective side (e.g., 26A) of the rotor 24. FIG. 4, and also FIG. 6, shows the pad (e.g., 36A) at an exaggerated spacing from the disk 24 for ease in showing components and ease in indicating the present invention. The pad (e.g., 36A) is made of composite material that has a relatively high coefficient of friction.

The caliper arrangement 28 includes two piston devices 40A and 40B. Each piston device (e.g., 40A) is associated with a respective one of the shoe/pad assemblies (e.g., 32A). Each piston device (e.g., 40A) is connected between a respective portion of the caliper head 30 and the respective shoe/pad assembly (e.g., 32A). Each piston (e.g., 40A) is actuatable to press the pad (e.g., 36A) of the respective shoe/pad assembly (e.g., 32A) into bearing engagement with the rotor 24. The pressing pads 36A and 36B squeeze inward on the rotor 24.

The bearing engagement of the pads 36A and 36B against the rotor 24 retards rotation of the rotor 24 and thus retards rotation of the wheel 18 (FIG. 1). A vehicle braking force is thus created in proportion to the force with which the pads 36A and 36B (FIG. 2) bear upon the rotor 24.

When the braking force is desired, an operator (not shown) of the vehicle 10 (FIG. 1) actuates a brake control mechanism 12, such as a brake pedal of the vehicle. The brake control mechanism 42 is operatively connected 44 to a brake actuation unit 46 (e.g., a power assist), which is in turn operatively connected 48 to all of the brake units 16. In response to actuation of the braking control mechanism 42 by the operator, the brake actuation unit 46 causes each piston device (e.g., 40A) to force the associated pad (e.g., 36A) against the rotor 24. The amount of retarding force provided by the pads 36A and 36B pressing on the rotor 24 is of course dependent upon the amount of force provided by the piston devices 40A and 40B.

Figure 5:
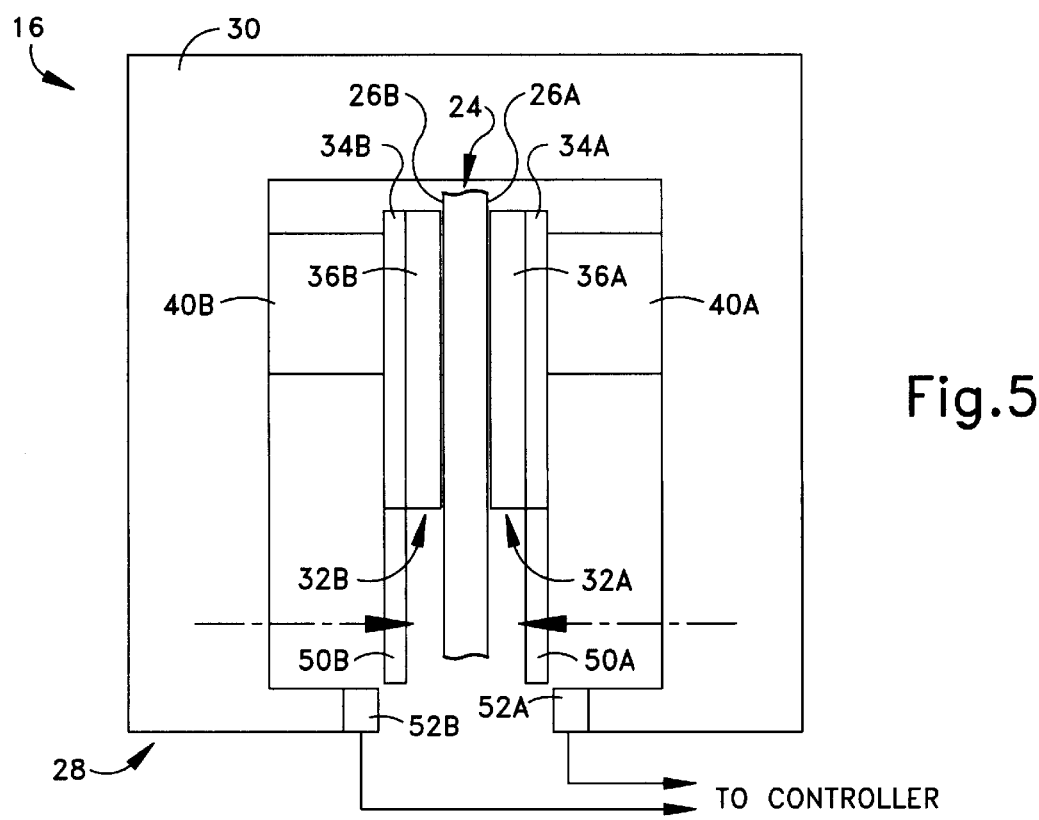
FIG. 5 is a view similar to FIG. 4, but with the brake pads in a second position.

The frictional engagements between the pads 36A and 36B and the rotor 24 cause the pads and the rotor to wear. As each pad (e.g., 36A) wears, the pad becomes thinner (as shown in FIGS. 4 and 5). The pads 36A and 36B are somewhat more susceptible to wear than the rotor 24 and thus wear somewhat faster than the rotor. Eventually, the pads 36A and 36B must be replaced to prevent damage to the rotor 24 or other components of the brake unit 16.

In order to monitor the wear of one of the brake pads (e.g., 36A), the thickness of that brake pad is monitored. In order to monitor pad thickness, the sensing system 14 includes a magnet (e.g., 50A) mounted for movement with the one of the pads (e.g., 36A), and a Hall effect sensor switch (e.g., 52A) mounted so that the one pad and the magnet move relative to the Hall effect sensor switch. In the illustrated example, the Hall effect sensor switch (e.g., 52A) is mounted on the caliper head 30.

The magnet (e.g., 50A) emits a magnetic field that permeates space adjacent to the magnet. The Hall effect sensor switch (e.g., 52A) detects the portion of magnetic field that is imposed upon the sensor switch. As will be understood via a comparison of FIGS. 3 and 5, the portion of the magnetic field that is imposed upon the Hall effect sensor switch (e.g., 52A) is dependent upon the location of the shoe/pad assembly relative to the caliper 30.

The portion of the magnetic field that is imposed upon the Hall effect sensor switch (e.g., 52A) changes in response to relative movement between the magnet (e.g., 50A) and the sensor switch. Accordingly, the Hall effect sensor switch (e.g., 52A) detects changes in the portion of the magnetic field that is imposed upon the sensor switch. Further, the amount of wear that the associated pad (e.g., 36A) has experienced results in a difference in the portion of the magnetic field that is imposed upon the Hall effect sensor switch (e.g., 52A).

A controller 56 of the brake pad wear sensing system 14 is operatively connected 58 to each of the Hall effect sensor switches (e.g., 52A). In response to the magnetic field, the Hall effect sensor switch (e.g., 52A) outputs an electric signal to the controller. The controller 56 processes information conveyed via the electric signal and determines whether the associated brake pad (e.g., 36A) is sufficiently worn to merit replacement.

An indicator 62 is operatively connected 64 to the controller 56. The indicator 62 may be visual or audio and is controlled by the controller 56 to provide an indication regarding brake pad wear status. In the illustrated example, of FIG. 1, the indicator is located within an instrument panel 66 of the vehicle 10.

Turning to FIG. 4, when the brake pad (e.g., 36A) is sufficiently worn, the signal output by the Hall effect sensor switch (e.g., 52A) provides an electrical output signal that indicates such a condition. Accordingly, at that point, the controller 56 controls the indicator 62 to provide an indication of the wear status.

It is to be appreciated that the indication may be dependent upon a voltage level of the signal output by the Hall effect sensor switch (e.g., 52A). As an alternative, the Hall effect sensor switch (e.g., 52A) may provide its signal in the form of a voltage sink connection to the controller 56 once the Hall effect sensor switch has been "tripped" by the associated magnet (e.g., 36A) moving to a specific position relative to the Hall effect sensor switch.

It should be appreciated that movement of a shoe/pad assembly (e.g., 32A) may change, as the associated pad (e.g., 36A) wears, dependent upon the specific mechanical construction of the caliper arrangement 28. The illustrated example indicates an ever increasing stoke distance of the shoe/pad assembly (e.g., 32A) that occurs during actuation of the brake system 12 as the pad (e.g., 36A) wears (compare FIGS. 3 and 5). The illustrated example is presented for ease of explanation of the present invention.

In another example, it is contemplated that the shoe/pad assembly (e.g., 32A) may be constantly biased into light engagement with the rotor 24. Thus, each actuation of the brake assembly does not cause an ever-increasing length of stroke of the shoe/pad assembly (e.g., 32A) relative to the caliper head 30. However, for such a caliper assembly 28, the location of the shoe (e.g., 36A) of the shoe/pad assembly (e.g., 32A) remaining at a relatively close spacing to the rotor 24 is monitored as an indication of pad wear. In other words, the controller 56 will monitor the progression of the shoe/pad assembly (e.g., 32A) inward toward the rotor 24. The indication of wear is provided when the shoe/pad assembly (e.g., 32A) is sufficiently close to the rotor.

In the illustrated example, the wear on both pads 36a and 36B is monitored. Accordingly, two magnets 50A and 50B, and two Hall effect sensor switches 52A and 52B are utilized. The first magnet 50A is affixed for movement with the first shoe/pad assembly 32A and the first Hall effect sensor switch 52A is mounted on the caliper head 30 on the side of the rotor 24 at which the first shoe/pad assembly 32A is located. Similarly, the second magnetic 50B is affixed for movement with the second shoe/pad assembly 32A and the second Hall effect sensor switch 52A is mounted on the caliper head 30 on the side of the rotor 24 at which the second shoe/pad assembly 32B is located.

In the illustrated embodiment, the Hall effect sensor switches 52A and 52B are mounted on the caliper head 30. However, it is to be appreciated that the Hall effect sensor switches 52A and 52B may be mounted on any structure that remains stationary during movement of the shoe/pad assemblies 32A and 32B. Further, it is to be appreciated that although the magnets are affixed to move with the respective shoe/pad assemblies while the Hall effect sensors remain stationary, the structure may be reversed such that each Hall effect sensor switch is mounted for movement with the respective shoe/pad assemblies and the associated magnet is mounted to be stationary.

Further, it is to be appreciated that as a brake pad wear sensing system is adjustable to provide indication at any suitable pad thickness. The adjustment is accomplished by simply relocating the position of the Hall effect sensor switch relative to the associated magnet on the shoe and pad assembly. For example, the switch may be located to provide a trip when the pad is worn to ten percent of its original thickness, fifteen percent of its original thickness, etc. Of course, the magnet may similarly be moved for such an adjustment.

From the above description of the invention, those skilled in the art will perceive improvements, changes and modifications. Such improvements, changes and modifications within the skill of the art are intended to be covered by the appended claims.

Having described the invention, the following is claimed:

1. A brake pad wear sensing system for a vehicle brake system having a rotor rotatable about an axis and a pad movable parallel to the axis to engage the rotor for creating braking force, said system comprising:
    a magnet providing a magnetic field;
    a Hall effect sensor sensing the magnetic field and outputting an electrical signal indicative of the sensed magnetic field;
    means for mounting one of said magnet and said sensor with the pad for movement parallel to the axis; and
    means for mounting the other of said magnet and said sensor at a location along the axis such that the signal from said sensor is indicative of pad wear.

2. A sensing system as set forth in claim 1, wherein said means for mounting one of said magnet and said sensor includes means for mounting said magnet for movement with said pad, and said means for mounting the other of said magnet and said sensor includes means for mounting said sensor such that the pad and said magnet move relative to said sensor.

3. A sensing system as set forth in claim 1, wherein said means for mounting one of said magnet and said sensor and said means for mounting the other of said magnet and said sensor include means for mounting said magnet and said sensor such that relative displacement of said magnet and said sensor is indicative of pad wear.

4. A sensing system as set forth in claim 1, wherein said sensor includes means for providing the signal indicative of pad wear to means for providing an indication regarding pad wear to a person.

5. A method of sensing brake pad wear for a vehicle brake system having a rotor rotatable about an axis and a pad movable parallel to the axis to engage the rotor for creating braking force, said method comprising:
    mounting one of a magnet and a Hall effect sensor with the pad for movement parallel to the axis;
    mounting the other of said magnet and said sensor at a location along the axis such that the signal from said sensor is indicative of pad wear, wherein the magnet provides a magnetic field, and wherein the Hall effect sensor sensing the magnetic field and outputting an electrical signal indicative of the sensed magnetic field; and
    sensing the magnetic field during operation of the brake system and providing the signal indicative of pad wear.

6. A method as set forth in claim 5, wherein said step of mounting one of the magnet and the sensor includes mounting the magnet for movement with the pad, and said step of mounting the other of the magnet and the sensor includes mounting the sensor such that the pad and the magnet move relative to the sensor.

7. A method as set forth in claim 5, wherein said steps mounting one of the magnet and the sensor and said mounting the other of the magnet and the sensor include mounting the magnet and the sensor such that relative displacement of the magnet and the sensor is indicative of pad wear.

8. A method as set forth in claim 5, including using the signal indicative of pad wear to provide an indication regarding pad wear to a person.

* * * * *